United States Patent [19]

Dakin et al.

[11] Patent Number: 4,861,980
[45] Date of Patent: Aug. 29, 1989

[54] OPTICAL SENSOR HAVING STATIONARY CO-TERMINUS ENDS OF THE INPUT AND OUTPUT OPTICAL FIBRES

[75] Inventors: John P. Dakin, Hampshire; Christopher A. Wade, Mariland, both of Great Britain

[73] Assignee: Plessey Overseas Limited, Ilford, England

[21] Appl. No.: 131,168

[22] Filed: Dec. 10, 1987

[30] Foreign Application Priority Data

Dec. 10, 1986 [GB] United Kingdom ............... 8629479

[51] Int. Cl.[4] .......................... H01J 5/16; H01J 40/14
[52] U.S. Cl. .................................. 250/227; 250/231 R
[58] Field of Search ............... 250/227, 231 P, 231 R; 73/705

[56] References Cited

U.S. PATENT DOCUMENTS

| 3,564,264 | 2/1971 | Karuhn | 250/231 R |
| 4,223,216 | 9/1980 | Quick et al. | 250/231 R |
| 4,408,123 | 10/1983 | Sichling et al. | 250/231 R |
| 4,427,881 | 1/1984 | Ruell | 250/227 |
| 4,564,755 | 1/1986 | Winzer et al. | 250/231 R |
| 4,666,304 | 5/1987 | Davies | 250/227 |
| 4,694,160 | 9/1987 | Hoogenboom et al. | 250/227 |
| 4,737,624 | 4/1988 | Schwarte | 250/227 |

Primary Examiner—David C. Nelms
Assistant Examiner—William L. Oen
Attorney, Agent, or Firm—Fleit, Jacobson, Cohn, Price, Holman & Stern

[57] ABSTRACT

A spectral filtering optical sensor comprises a stationary zone plate and stationary co-terminous ends of input and output fibres with the interposition in the optical path between the zone plate and the optical fibre ends of a variable optical focussing arrangement the focussing characteristics of which change with changes in magnitude of the particular parameter being sensed and thereby vary the effective optical path length between the zone plate and the optical fibre ends and the wavelength of light impinging on the end of the output fibre.

8 Claims, 1 Drawing Sheet

U.S. Patent  Aug. 29, 1989  4,861,980
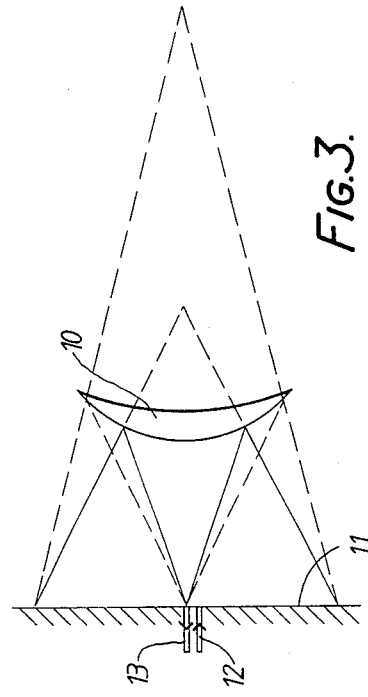
Fig.3.
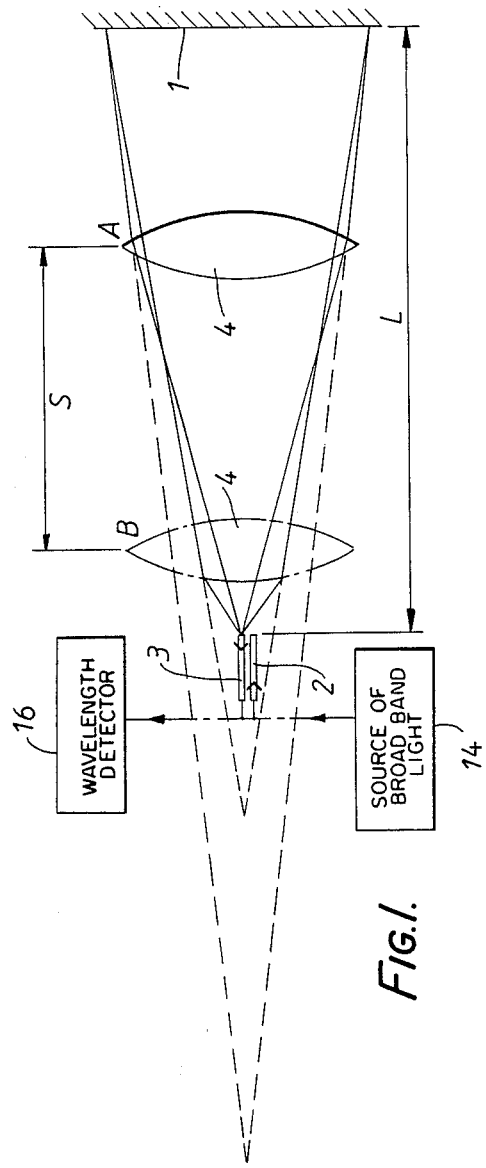
Fig.1.
Fig.2.

OPTICAL SENSOR HAVING STATIONARY CO-TERMINUS ENDS OF THE INPUT AND OUTPUT OPTICAL FIBRES

IMPROVEMENTS RELATING TO OPTICAL SENSORS

This invention relates to optical sensors and relates more specifically to so-called spectral filtering optical sensors comprising a zone plate and associated input and output optical fibres having coterminous ends located at a predetermined distance from the zone plate and in which broadband light emerging from the end of the input fibre is arranged to be reflected by the zone plate before it impinges on the co-terminous end of the output optical fibre. Any variations in the effective optical path length between the zone plate and the ends of the optical fibres due to changes in a parameter (e.g. pressure, temperature, or linear displacement) being sensed will produce changes in wavelength of the light impinging on the output fibre which can be detected and/or measured.

In known constructions of such spectral filtering optical sensors the zone plate is arranged to move linearly in response to changes in parameter in order to produce variations in optical path length between the zone plate and the co-terminous ends of the optical fibres. Alternatively, a movable plate mirror is interposed between the zone plate and the optical fibre ends which are maintained stationary.

The present invention is directed to a spectral filtering optical sensor which has reduced sensitivity to angular perturbations of the movable optical components (i.e. zone plate and plate mirror in the known constructions described above) whilst permitting an increase in the allowable stroke length of the movable component for a given overall sensor length.

BACKGROUND OF THE INVENTION

This invention relates to optical sensors and relates more specifically to so-called spectral filtering optical sensors comprising a zone plate and associated input and output optical fibres having coterminous ends located at a predetermined distance from the zone plate and in which broadband light emerging from the end of the input fibre is arranged to be reflected by the zone plate before it impinges on the co-terminous end of the output optical fibre. Any variations in the effective optical path length between the zone plate and the ends of the optical fibres due to changes in a parameter (e.g. pressure, temperature, or linear dislacement) being sensed will produce changes in wavelength of the light impinging on the output fibre which can be detected and/or measured.

In known constructions of such spectral filtering optical sensors the zone plate is arranged to move linearly in response to changes in parameter in order to produce variations in optical path length between the zone plate and the co-terminous ends of the optical fibres. Alternatively, a movable plate mirror is interposed between the zone plate and the optical fibre ends which are maintained stationary.

SUMMARY OF THE INVENTON

The present invention is directed to a spectral filtering optical sensor which has reduced sensitivity to angular perturbations of the movable optical components (i.e. reflective zone plate and plane mirror in the known constructions described above) whilst permitting an increase in the allowable stroke length of the movable component for a given overall sensor length.

According to the present invention there is provided a spectral filtering optical sensor comprising a stationary zone plate and stationary co-terminous ends of input and output optical fibres with the interposition in the optical path between the zone plate and the optical fibre ends of a variable optical focusing arrangement the focusing characteristics of which change with changes in magnitude of the particular parameter being sensed and thereby vary the effective optical path length between the zone plate and the optical fibre ends and the wavelength of light impinging on the end of the output optical fibre.

In carrying out the present invention the characteristics of the focusing arrangement may be varied by changing the position of a complex lens relative to the zone plate.

Alternatively, the focusing arrangement may comprise a stationary optical component the refractive index and/or physical size or shape of which can be modified by changes in the parameter being sensed. For example, a flexible mirror may be provided as the variable focusing arrangement and the curvature of the mirror modified, as by changes in pressure, in order to vary the focal length of the mirror.

BRIEF DESCRIPTION OF DRAWING

By way of example the present invention will now be described with reference to the accompanying drawings in which:

FIG. 1 shows a linear displacement spectral filtering optical sensor according to the invention;

FIG. 2 shows a practical mounting arrangement for the movable lens of the sensor shown in FIG. 1; and, FIG. 3 shows a spectral filtering optical pressure sensor according to the present invention.

DETAILED DESCRIPTION OF PREFERRED EMBODIMENT

Referring to FIG. 1 of the drawings, the spectral filtering arrangement of a sensor comprises a stationary zone plate 1 having a planar reflective surface as shown which is spaced from the fixed co-terminous ends of input and output optical fibres 2 and 3. A linearly movable convex lens 4 constitutes a variable focussing arrangement for broadband light emerging from the end of the input optical fibre 2. This movable lens 4 may for example be mechanically linked by any convenient means to a movable object (not shown) the displacement (e.g. linear displacement) of which is required to be sensed by the sensor. As the position of the movable object changes so the axial position of the lens 4 changes relative to the zone plate1, such as from position A to position B, thereby varying the effective focusing characteristic of the lens. This has the effect of changing the wavelength (or colour) of light reflected from plate 1 and focussed on lens 4 as shown for impinging on the end of the output fibre 3. The changes in wavelength can be detected by detector 16 as diagrammatically shown in FIG. 1 in order to provide an indication of the linear displacement of the aforesaid movable object. This arrangement has the advantage of providing an increased ratio between the stroke length (S) and the overall sensor length (L) relative to the known constructions of spectral filtering sensors previously described.

As regards a practical constructional arrangement for the sensor of FIG. 1, FIG. 2 shows one such arrangement especially envisaged. In this arrangement an actuator rod 5 which will be mechanically coupled to the aforesaid movable object being sensed passes through a central hole 6 in the zone plate 7 and is attached to a spoked lens mounting 8 which accommodates the convex lens 9. It may here be mentioned that a second convex lens (not shown) may be introduced at a fixed location near to the input and output fibre ends in order to match the aperture of the fibres to that of the sensor. In this connection reference is hereby directed to our copending British patent application No. 8606550.

Referring now to FIG. 3 of the drawing, this shows a pressure sensor which includes a fixed position flexible convex mirror 10 as the variable focusing arrangement positioned in the optical path between the zone plate 11 and the input and output optical fibre ends 12 and 13 all of which are co-terminous in this embodiment. The broadband light emerging from the end of the input fibre 12 illuminates the mirror 10 which in turn illuminates and gathers retro-diffracted light from the zone plate 11. The mirror 10 also refocuses the returned light on to the end of output fibre 13. The centre wavelength of the light impinging on the end of the output fibre 13 depends on the effective distance or path length between the co-terminous fibre ends and the zone plate which length is partly determined by the focal length of the mirror. Since the mirror 10 is flexible changes in hydrostatic pressure across the mirror will produce variations in its curvature thereby changing its focal length and the effective distance between the zone plate 11 and the optical fibre ends. Consequently, variations in the centre wavelength of the light impinging on the output fibre enables the differential pressure exerted on the flexible mirror to be determined.

In a further embodiment also envisaged the variable focusing arrangement takes the form of a movable mirror and convex lens located between the stationary zone-plate and co-terminous ends of the input and output optical fibres.

We claim:

1. A spectral filtering optical sensor sensing a particular parameter, comprising a reflective stationary zone plate from which broadband light is divided into spectral components and input and output optical fibres spaced therefrom having stationary co-terminus ends establishing an optical path, said input fibre receiving the broadband light from a remote source, a variable optical focusing arrangement having focusing characteristics varying in response to changes in magnitude of the particular parameter being sensed to vary the effective optical path length between the zone plate and the optical fibre ends and the wavelength of light impinging on the fibre end of the output optical fibre.

2. A spectral filtering optical sensor as claimed in claim 1, in which the variable focusing arrangement comprises a convex lens having a linear position varied relative to the zone plate in response to changes in the parameter being sensed.

3. A spectral filtering optical sensor as claimed in claim 1, in which the focusing arrangement comprises a stationary optical component having a refraction index modified in response to changes in the parameter being sensed.

4. A spectral filtering optical sensor as claimed in claim 3, in which the stationary optical component comprises a flexible convex mirror having a curvature establishing a focal length modified by changes in the parameter being sensed.

5. A spectral filtering optical sensor as claimed in claim 2, including a movable actuator rod passing through the zone plate and coupled to the convex lens.

6. A spectral filtering optical sensor as claimed in claim 1, in which the variable focusing arrangement comprises a movable mirror and a convex lens operatively located between the stationary zone-plate and the co-terminous ends of the input and output optical fibres.

7. In a sensor device for measuring a physical parameter, having a source of light, light-transmitting fiber means for conducting said light, detector means for receiving said light emerging from the fiber means to indicate the value of said physical parameter, lens means for focusing the light received from the source on the fiber means and means for displacing said lens means in dependence upon said physical parameter, the improvement comprising stationary reflector means mounted in fixed relation to said fiber means for establishing with the lens means an optical path of variable length along which different wavelength components of the light travel to the fiber means, said fiber means having a single fiber end at which said optical path of variable length is terminated, said lens means having an optical axis along which a focal length thereof is varied by said displacing means, said optical axis extending between said single fiber end and the reflector means, and the value of the parameter being indicated by the wavelength component of the light received by the detector means from said single fiber end.

8. The sensor device according to claim 7, wherein said lens means is displaceable along the optical axis thereof.

* * * * *